US008821185B2

(12) United States Patent
Kreil et al.

(10) Patent No.: US 8,821,185 B2
(45) Date of Patent: Sep. 2, 2014

(54) LOCKING DEVICE FOR A CONNECTING ARRANGEMENT

(71) Applicant: Bayerische Motoren Werke Aktiengesellschaft, Munich (DE)

(72) Inventors: Franz Kreil, Pliening (DE); Andre Frenzel, Kirchberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/745,195

(22) Filed: Jan. 18, 2013

(65) Prior Publication Data

US 2013/0137295 A1    May 30, 2013

Related U.S. Application Data

(63) Continuation of application No. PCT/EP2011/003267, filed on Jul. 1, 2011.

(30) Foreign Application Priority Data

Jul. 22, 2010    (DE) .......................... 10 2010 031 662

(51) Int. Cl.
*H01R 13/66*    (2006.01)
(52) U.S. Cl.
USPC ........................................................ 439/527
(58) Field of Classification Search
USPC ................. 439/527–528, 374–375, 271, 278; 234/538; 385/319, 330
See application file for complete search history.

(56) References Cited

U.S. PATENT DOCUMENTS

| 6,834,891 B2 * | 12/2004 | Matsubara et al. ........... 285/319 |
| 6,863,314 B2 * | 3/2005 | Guest .............................. 285/81 |
| 7,967,342 B2 | 6/2011 | Gunderson |
| 2004/0061332 A1 * | 4/2004 | Takayanagi et al. .......... 285/319 |
| 2006/0208743 A1 | 9/2006 | Ishida et al. |
| 2008/0012314 A1 | 1/2008 | Harger et al. |

FOREIGN PATENT DOCUMENTS

| DE | 37 10 853 A1 | 10/1988 |
| DE | 37 27 858 A1 | 1/1989 |

(Continued)

OTHER PUBLICATIONS

German Search Report dated Jun. 16, 2011 including partial English-language translation (Ten (10) pages).

(Continued)

*Primary Examiner* — Jean F Duverne
(74) *Attorney, Agent, or Firm* — Crowell & Moring LLP

(57) ABSTRACT

A locking device for a connecting arrangement between a connecting piece and a plug-type connector, which connecting piece has, radially on the outside, at least one first undercut region extending in the circumferential direction, which plug-type connector has, radially on the inside, at least one second undercut region which is suitable for corresponding with the first undercut region in an engagement position and can be elastically deformed in the radial direction such that the first undercut region and the second undercut region can be engaged or disengaged. The locking device is suitable for preventing a radial elastic deformation of the plug-type connector at least to such an extent that, in the connecting position, the first undercut region and the second undercut region are fixed in the corresponding engagement position.

13 Claims, 4 Drawing Sheets

(56) References Cited

FOREIGN PATENT DOCUMENTS

| | | |
|---|---|---|
| DE | 39 24 173 A1 | 1/1991 |
| DE | 10 2004 041 773 A1 | 3/2006 |
| DE | 10 2006 009 528 A1 | 9/2006 |
| DE | 10 2006 030 058 A1 | 1/2008 |
| EP | 1 873 439 A2 | 1/2008 |

OTHER PUBLICATIONS

International Search Report dated Dec. 1, 2011 including English-language translation (Six (6) pages).

* cited by examiner

LOCKING DEVICE FOR A CONNECTING ARRANGEMENT

CROSS REFERENCE TO RELATED APPLICATIONS

This application is a continuation of PCT International Application No. PCT/EP2011/003267, filed Jul. 1, 2011, which claims priority under 35 U.S.C. §119 from German Patent Application No. 10 2010 031 662.8, filed Jul. 22, 2010, the entire disclosures of which are herein expressly incorporated by reference.

BACKGROUND AND SUMMARY OF THE INVENTION

The invention relates to a locking device for a connecting arrangement between a connecting piece and a plug connector, wherein the connecting piece has, radially on the outside, at least a first undercut region extending in the circumferential direction. The plug connector has, radially on the inside, at least a second undercut region especially suited for corresponding with the at least one first undercut region in an engagement position and elastically deformable in the radial direction such that the at least one first undercut region and the at least one second undercut region can engage or disengage.

Such a connecting arrangement comprising a connecting piece and a plug connector is known, for example, from DE 37 27 858 A1. According to DE 37 27 858 A1, the connecting piece has, radially on the outside, a circumferential ring that exhibits a ramp surface and a stop surface. The plug connector is designed in the shape of an oval or ellipse in cross-section. In this case the inside diameter of the plug connector is larger than the outside diameter of the connecting piece, so that the plug connector envelops the connecting piece in such a way that it is spaced apart from the connecting piece in the radial direction. The plug connector has two diametrically opposite cams on the inside; and each of these cams exhibits a ramp surface and a stop surface.

When the plug connector is connected to the connecting piece in the axial direction, the ramp surfaces on the plug connector side and the ramp surface on the connecting piece side extend one on top of the other; and the cams of the plug connector latch with the ring of the connecting piece, in that the stop surfaces on the plug connector side and the stop surface on the connecting piece side reach behind each other so that the plug connector is securely connected to the connecting piece.

The plug connector can be deformed elastically in the radial direction. In order to loosen the connecting arrangement, the plug connector is compressed from the outside in the regions between the cams. In so doing, the cams are displaced radially towards the outside, and the stop surfaces on the plug connector side and the stop surface on the connecting piece side disengage, so that the plug connector can be detached from the connecting piece.

Such a connecting arrangement with a connecting piece and a plug connector is also the subject matter of EP 1 873 439 A2.

It may be necessary for safety reasons and/or due to statutory regulations to ensure such a connecting arrangement against an unintentional loosening.

Therefore, the object of the invention is to provide a locking device for the type of connecting arrangement described above.

This and other objects are achieved with a locking device that is configured for a connecting arrangement between a connecting piece and a plug connector, wherein the connecting piece has, radially on the outside, at least a first undercut region, which extends in the circumferential direction; and wherein the plug connector has, radially on the inside, at least a second undercut region, which is especially suited for corresponding with the at least one first undercut region in an engagement position and can be elastically deformed in the radial direction such that the at least one first undercut region and the at least one second undercut region can engage or disengage. The locking device is especially suited for preventing the plug connector from deforming elastically in the radial direction at least to such an extent that in the connecting position the at least one first undercut region and the at least one second undercut region are fixed in the corresponding engagement position.

A connecting arrangement, which is secured with a locking device according to the invention, can be detached only if the locking device is removed, or if the corresponding regions of the connecting piece and/or the corresponding regions of the plug connector are destroyed. This arrangement effectively prevents the connecting arrangement from loosening unintentionally.

For a connecting arrangement, wherein in the connecting position an intermediate space, which extends in the circumferential direction, is formed between the connecting piece and the plug connector, the locking device is especially suited preferably for a positive locking engagement with the intermediate space. As a result, a deformation of the plug connector is blocked in such a way that an unintentional loosening of the connecting arrangement is effectively prevented.

According to a preferred exemplary embodiment, the locking device has a first locking region, which is assigned to the connecting piece. In this context it is practical for the locking device to be configured in such a way that the locking device is adapted to the connecting piece in the form of a clip; and, as a result, the locking device itself forms the first locking region.

According to a preferred exemplary embodiment, the locking device has additionally a second locking region, which is assigned to the intermediate space. In this context it has proven to be practical for the second locking region to be adapted to the shape of the intermediate space.

According to a preferred exemplary embodiment, the locking device has additionally a third locking region, which is assigned to the plug connector. Preferably, the third locking region is configured in the form of a latching hook.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
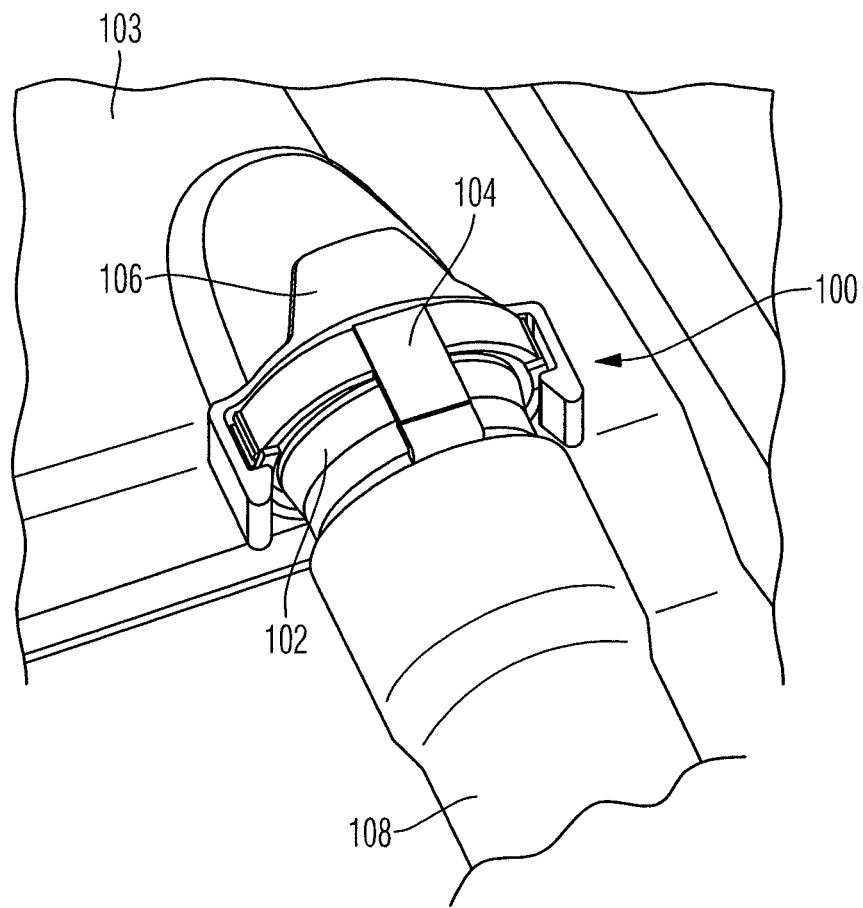
FIG. 1 shows a connecting arrangement, which is secured against an unintentional loosening and which may be found between a connecting piece and a plug connector in the connecting position.

FIG. 1 shows a connecting arrangement 100, which is secured against an unintentional loosening and which may be found between a connecting piece 102 and a plug connector 104 in the connecting position. The connecting arrangement 100 is used, in particular, to connect media-conducting lines during the production of automobiles, preferably for application in the area of aeration and ventilation.

The exemplary embodiment shows a plug connector 104 that is connected to a ventilation hose 108. The hose 108 connects a ventilation port of a crankcase (not illustrated here) of an internal combustion engine of a motor vehicle to an inlet port in the air intake tract 103 of the internal combustion engine. When the internal combustion engine is running, the blow-by-gases from the crankcase can be fed through the hose 108 to the air intake tract and, in so doing, can be passed to the combustion chamber of the internal combustion engine. On the crankcase side a separator device for separating the gas and the liquid, such as oil or oil vapor, is disposed typically upstream of the hose 108; and/or a valve is disposed typically upstream of the hose.

According to other exemplary embodiments, which are not shown here, the connecting arrangement including a connecting piece and a plug connector can also be used to connect a different line, in particular, to connect fuel lines, fuel tank ventilation lines, secondary air lines, oil cooler lines or brake pressure lines.

The inlet port in the air intake tract 103 of the internal combustion engine is designed as an angled connecting piece 102. The opening of the hose 108 with the plug connector 104 is slid onto the connecting piece 102 in the axial direction and latched with the connecting piece 102. A locking device 106 prevents the connection from loosening.

Figure 2A:
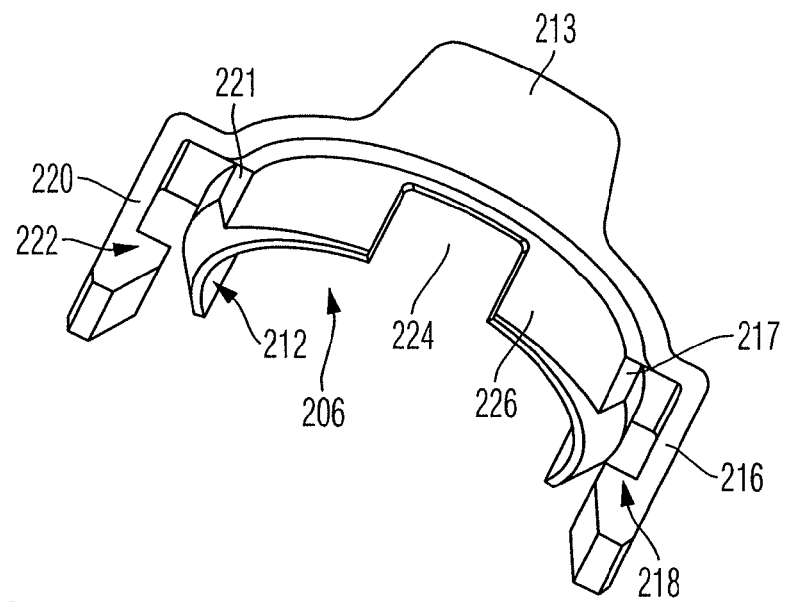
FIG. 2a shows a locking device in a spatial representation from the outside.
Figure 2B:
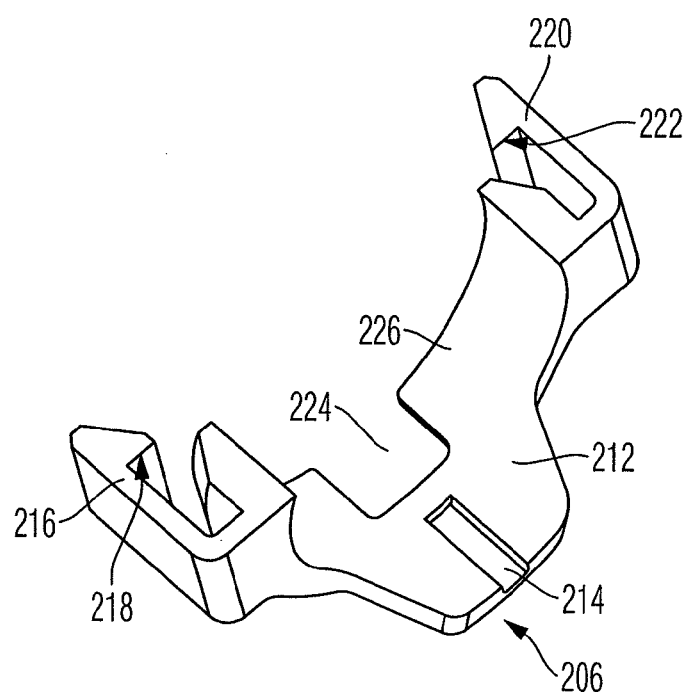
FIG. 2b shows a locking device in a spatial representation from the inside.

FIGS. 2a and 2b are, in each instance, a detail view of the locking device 206. FIG. 2a shows the locking device 206 (106 in FIG. 1) in a spatial representation from the outside; and FIG. 2b shows the locking device in a spatial representation from the inside. The locking device 206 is designed in its entirety in the form of a clip in such a way that it is adapted to the diameter of the connecting piece (FIG. 1: 102). The locking device 206 encloses a circumference, which extends over an angular range of a little more than 180°, in particular extends over an angular range of approximately 200° to approximately 220°, in the form of a circular arc. As a result, the locking device 206 itself forms a first locking region 212, which is assigned to the connecting piece.

A recess 214 that has the shape of a groove corresponds with a matching contour of the connecting piece 102, so that the result is a positive locking connection that allows the connecting piece 102 and the locking device 206 to be secured in position. A break-through 224, which is configured so as to be approximately rectangular in the present embodiment, enables a direct connection between the connecting piece and the plug connector in the connecting position. A region 213, which is configured in the manner of a tab, guarantees both a reliable hold and a support of the locking device 206 on the connecting piece.

A second locking region 226 is especially suited for engagement with an intermediate space (FIG. 4: 444), which in the connecting position is formed between the connecting piece and the plug connector. The second locking region 226 is adapted with respect to its shape to this intermediate space and extends in the circumferential direction on both sides of the break-through 224. Starting from the break-through 224, the second locking region 226 has an increasing thickness in the radial direction. The axial front side of the second locking region 226 is designed in such a way that it is chamfered, in order to make it easier to insert into the intermediate space. In addition, a contour 217 and a contour 221, which is directed in the opposite direction, guarantee that the locking device 206 and the plug connector are positionally secured in a positive locking manner.

Two latching hooks 216, 220 form a third locking region, which is assigned to the plug connector (FIG. 1: 104). The latching hooks 216, 220 are arranged laterally of the locking device 206 in such a way that they are situated diametrically opposite; and each of these latching hooks has a hook 218, 222 having a ramp surface and a stop surface. In the connecting position the latching hooks 216, 220 lend themselves especially well to latching with a corresponding contour of the plug connector.

Figure 3A:
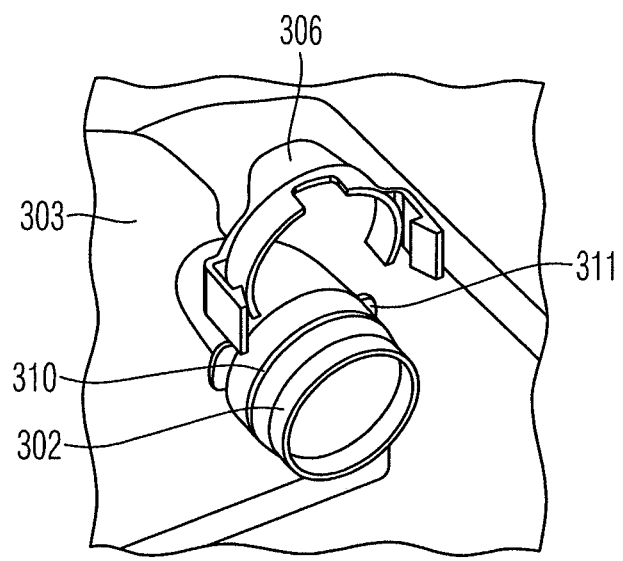
FIG. 3a shows a connecting piece with a locking device during assembly.

FIG. 3 shows the assembly of the connecting arrangement 300. In this context FIG. 3a shows how the locking device 306 is installed at the connecting piece 302 of the air intake tract 303. The locking device 306 is clipped on the connecting piece 302 in the radial direction. With suitable contours it is possible to guarantee a predefined position of the locking device 306 on the connecting piece 302 in both the radial and axial direction. In the present embodiment the connecting piece side has a contour, which corresponds to the recess (FIG. 2: 214) of the locking device 306, as well as two wing-like contours 311 for the purpose of positioning. The wing-like contours 311 also serve, in particular, to support the locking device 306 in the axial direction, when the plug connector 304 is installed.

Figure 3B:
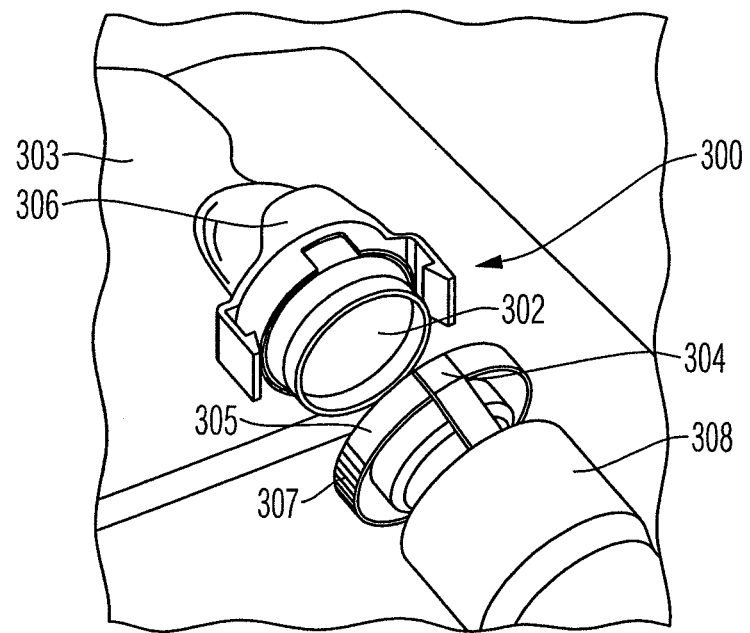
FIG. 3b shows a connecting piece with a locking device and a plug connector during assembly.

FIG. 3b shows how the hose 308 is then installed with the plug connector 304. The connecting piece 302 has circumferentially an annular contour 310 with a ramp surface and a stop surface. The plug connector 304 has a region 305, which is designed in the form of a flat ring and comprises two cams, which are diametrically opposite on the inside. Each of the cams has a ramp surface and a stop surface. Offset by approximately 90° relative to the cams in the circumferential direction, the flat ring-shaped region 305 of the plug connector 304 has on the outside two diametrically opposite contourings 307, which make it easier to compress the region 305 that is designed in the form of a flat ring.

The plug connector 304 is pushed on in the axial direction, so that in the region of the recess (FIG. 2: 214) as well as diametrically opposite, the plug connector 304 and the connecting piece 302 are connected in a positive locking manner, in that the cams of the plug connector 304 latch with the annular contour 310 of the connecting piece 302. In so doing, the second locking region 226 engages with the intermediate space that is formed between the connecting piece 302 and the plug connector 304 in the connecting position. The chamfering of the locking device 306 on the front side makes it easier to push on the plug connector 304. The latching hooks (FIG. 2: 216, 220) latch with the flat ring-shaped region 305 of the plug connector 304 in the region of the contourings 307; and then the latching hooks overlap these contourings from the outside.

Figure 4A:
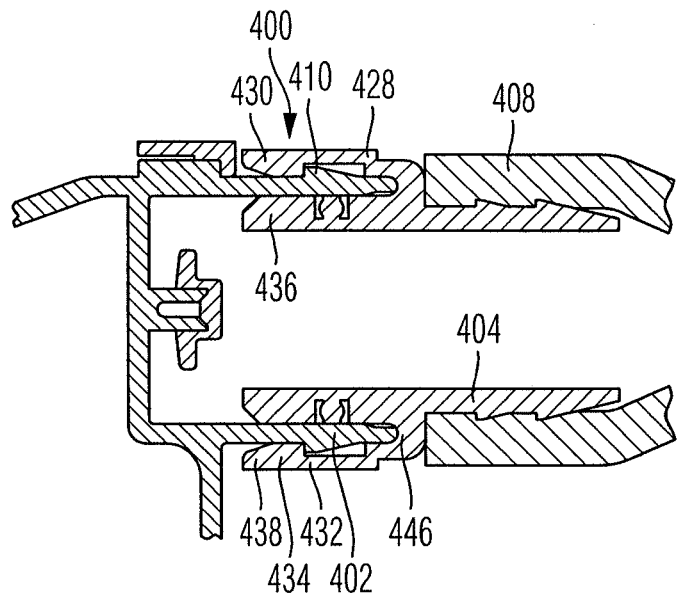
FIG. 4a is a longitudinal view of a connecting arrangement, which is secured against an unintentional loosening and which may be found between a connecting piece and a plug connector in the connecting position.
Figure 4B:
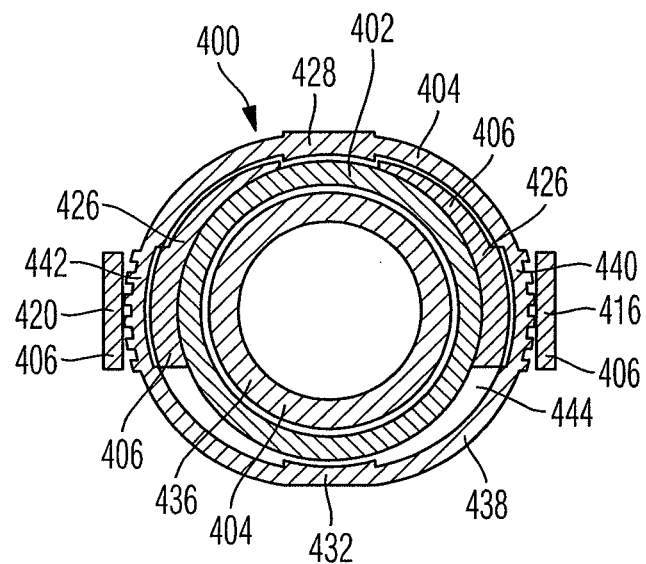
FIG. 4b is a cross sectional view of a connecting arrangement, which is secured against an unintentional loosening and which may be found between a connecting piece and a plug connector in the connecting position.

FIG. 4 is a longitudinal view of a connecting arrangement 400, which is secured against an unintentional loosening and which is situated between a connecting piece 402 and a plug connector 404 in the connecting position; and FIG. 4b is a cross sectional view of the same.

The connecting piece 402 has circumferentially an annular contour 410 having a ramp surface and a stop surface. The plug connector 404 has a region 438, which is designed in the form of a flat ring and includes two diametrically opposite connecting regions 428, 432, for the purpose of connecting to the connecting piece 402. The connecting regions 428, 432 comprise the cams 430, 434 on the inside; and each of the cams has a ramp surface and a stop surface. The cams 430, 434 of the plug connector 404 are latched with the annular contour 410 of the connecting piece 402, in that the stop surfaces of the annular contour 410 and the stop surfaces of the cams 430, 434 reach behind each other. Offset by approximately 90° relative to the cams 430, 434 in the circumferential direction, the flat ring-shaped region 438 of the plug connector 404 has on the outside two diametrically opposite contourings 440, 442, which make it easier to compress the region 438 that is designed in the form of a flat ring. The plug connector 404 has radially on the inside a region 436 that is configured in the form of a connecting piece; and the plug connector is inserted with this region into the connecting piece 402. In this case at least one seal is arranged between the plug connector 404 and the connecting piece 402. The region 436 of the plug connector that is configured in the form of a connecting piece and the region 438 of the plug connector 404 that is configured in the form of a flat ring define jointly together a U-shaped receiving space with a bottom 446. This receiving space receives the connecting piece 402 in such a way that the axial edge region of the connecting piece rests against the bottom 446 of this receiving space.

In order to prevent the connecting arrangement 400 from becoming loose unintentionally, a locking device 406 is provided; and the locking device is connected, on the one hand, to the connecting piece 402 and, on the other hand, to the plug connector 404. The flat ring-shaped region 438 of the plug connector 404 is prevented from compressing; and, as a result, the cams 430, 434 are prevented from loosening from the annular contour 410 of the connecting piece 402.

The locking device 406 includes a second locking region 426 that engages with the intermediate space 444, which is formed between the connecting piece 402 and the plug connector 404. In this case the second locking region 426 fills in a positive locking manner the intermediate space 444 at least in certain regions in the radial direction, in that the second locking region 426 rests against the radial outer surface of the connecting piece 402 and rests against the radial inner surface of the flat ring-shaped region 438 of the plug connector 404. It is not necessary that the intermediate space 444 be filled by the locking region 426 of the locking device 406 over the entire periphery. What is important is that the flat ring-shaped region 438 of the plug connector 404 be prevented from compressing in the region of the contourings 440, 442. The latching hooks 416, 420 form a third locking region of the locking device 406. The latching hooks 416, 420 are latched with the flat ring-shaped region 438 of the plug connector 404 in the region of the contourings 440, 442 and overlap the contourings from the outside. Moreover, in addition to and beyond the specification, reference is made to the accompanying figures.

The locking device 406 is fabricated preferably from a synthetic plastic material, in particular a recyclable material exhibiting low permeation values, such as polyamide, and in addition or optionally filled. In the present embodiment the locking device 406 is made of polyamide 6 with 30% glass fibers or made of polyamide 12 with 20% glass fibers.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A connecting arrangement, comprising:
    a connecting piece;
    a plug connector having, radially on an outside, a ring-shaped region;
    a locking device for the connecting arrangement, the connecting arrangement being between the connecting piece and the plug connector, wherein the locking device is configured to radially clip onto the connecting piece, and wherein the locking device comprises at least one latching hook configured to axially overlap and latch onto the ring-shaped region of the plug connector when the locking device is clipped onto the connection piece, wherein
    the connecting piece has, radially on an outside, at least a first undercut region extending in a circumferential direction,
    the plug connector has, radially on an inside, at least a second undercut region adapted to correspond with the at least one first undercut region of the connecting piece in an engagement position, the second undercut region being elastically deformable in a radial direction to allow the first and second undercut regions to be engaged or disengaged,
    the locking device being operatively configured to prevent the plug connector from deforming elastically in a radial direction at least to an extent such that in a connecting position the first undercut region and the second undercut region are fixed in a corresponding engagement position.

2. The connecting arrangement according to claim 1, wherein, in the connecting position, an intermediate space is formed between the connecting piece and the plug connector, the intermediate space extending in a circumferential direction;
    wherein the locking device is configured for a positive locking engagement with the intermediate space.

3. The connecting arrangement according to claim 1, wherein the locking device forms a first locking region when radially clipped onto the connecting piece.

4. The connection arrangement according to claim 2, wherein the locking device forms a first locking region when radially clipped onto the connecting piece.

5. The connecting arrangement according to claim 3, wherein the locking device is configured as a clip that forms the first locking region, the clip being adapted to the connecting piece.

6. The connecting arrangement according to claim 4, wherein the locking device comprises a second locking region operatively assigned to the intermediate space.

7. The connecting arrangement according to claim 6, wherein the second locking region is adapted to a shape of the intermediate space.

8. The connecting arrangement according claim 6, wherein the locking device comprises a third locking region operatively assigned to the plug connector.

9. The connecting arrangement according to claim 7, wherein the locking device comprises a third locking region operatively assigned to the plug connector comprising the at least one latching hook.

10. The connecting arrangement according to claim 8, wherein the third locking region comprises two latching hooks.

11. The connecting arrangement according to claim 9, wherein the third locking region comprises two latching hooks.

12. The connecting arrangement according to claim 1, wherein the ring-shaped region of the plug connector comprises a flat ring-shaped region having contourings disposed thereon.

13. The connecting arrangement according to claim 12, wherein the contourings are configured to engage the at least one latching hook of the locking device.

\* \* \* \* \*